Patented Jan. 17, 1950

2,494,924

UNITED STATES PATENT OFFICE 2,494,924

POLYMERIZING STYRENE IN IRON VESSELS

James L. Amos and Kenneth E. Stober, Midland, Mich., assignors to The Dow Chemical Company, Midland, Mich., a corporation of Delaware No Drawing. Application December 9, 1946, Serial No. 715,143

6 Claims. (Cl. 260—93.5)

This invention concerns a method whereby vessels constructed of iron, ordinary steel, e. g. a carbon steel, or an alloy steel capable of rusting, may satisfactorily be employed in polymerizing or co-polymerizing alpha-alkenyl aromatic compounds having the general formula:

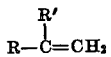

wherein R represents an aromatic radical of the benzene series and R' represents hydrogen or a methyl radical, to form solid polymeric products. The invention pertains especially to repeated employment of such vessels for the polymerization of polymerizable materials rich in monovinyl aromatic compounds, particularly styrene.

It is well known that the reactions for the polymerization of vinyl and vinylidene compounds are highly exothermic, that the polymerizates are poor conductors of heat, and that during polymerization the materials tend to absorb or otherwise be contaminated with any particles of dust, grease, rust, metal oxides, or metal salts, etc., which may be contacted therewith. The quality of the polymeric product is dependent to a large extent upon the polymerization being carried out at controlled temperatures and with careful exclusion of substances capable of contaminating the product.

In order to accomplish such polymerization in a satisfactory manner, it is necessary that surfaces, e. g. of the polymerization vessel, or of cooling or heating tubes within the vessel, possess good heat conductivity, be chemically inert to the material to be polymerized, and have no effect of contaminating the polymerizate. Vessels of iron or steel are satisfactory from a viewpoint of thermal conductivity and cost, and are frequently employed in polymerizing vinyl or vinylidene compounds while dissolved or dispersed in an inert liquid medium. However, vessels of iron or steel have heretofore been considered objectionable and have usually been avoided when such polymerizations were to be carried out en masse, i. e. without use of a considerable proportion of an inert liquid as a reaction medium.

For instance, Young et al., in U. S. Patent No. 2,011,132, teach that iron, if contacted with a vinyl compound during mass, or solution polymerization of the latter, tends to inhibit the polymerization reaction and to contaminate the polymerization mixture with iron-containing impurites whch, even when present in minute amount, seriously impair the properties of the polymeric product. Young et al., and others, have recommended that the mass, or solution polymerization of vinyl and vinylidene compounds be carried out in vessels having inner surfaces of lead, tin, aluminum, or stainless steel. Vessels having inner surfaces of the materials recommended are, of course, more difficult to construct and considerably more expensive than vessels of iron or steel. Lead, in particular, is somewhat objectionable because of its relatively poor heat conductivity. Also, lead and tin have undesirably low melting points, so close to temperatures sometimes employed in fusing and discharging polymeric products that accidental overheating may cause damage to the vessel.

We have found that a batch of polymerizable material comprising an alkenyl aromatic compound may satisfactorily be polymerized en masse within a vessel of iron, cast iron, or steel, provided the material to be polymerized is freed of dissolved air or oxygen, and inner surfaces of the vessel are cleaned to free them as thoroughly as possible of grease, rust, or metal salts, prior to employment in the reaction. Complete removal of all traces of iron oxide from the inside of a vessel is extremely difficult and is seldom, if ever, attained. When these precautions are observed, the iron or steel vessel has little, if any, effect on the rate of the polymerization reaction and does not cause appreciable contamination of the first batch of polymer formed in the vessel. However, on standing, e. g. at room temperature between periods of use, the layer of polymer retained on inner walls of the vessel cracks and tends to break away from the walls carrying with it a small amount of iron-containing impurities, e. g. iron oxide, and at the same time exposing wall surfaces so that they may undergo further corrosion. As a consequence, subsequent batches of polymer formed in the vessel are usually contaminated with iron-containing impurities and are of poor quality.

Surfaces of iron or steel are extremely susceptible to oxidation or corrosion, and the presence thereon of a minute amount of rust or an iron salt is sufficient to impair the quality of successive batches of polymer formed within the vessel. It is extremely difficult to protect an iron or steel vessel against corrosion when standing empty, e. g. between periods of use, since any rust preventive applied to the metal surfaces would, of itself, serve as a contaminant for polymers subsequently formed in the vessel. It is, of course, evident that the thorough cleansing to remove grease, rust, or metal salts, which is necessary before a vessel of iron or steel may satisfactorily be used in polymerizing an alkenyl aromatic compound en masse, is costly and inconvenient, and that if such cleansing operation were required prior to each batchwise polymerization reaction, the use of polymerization vessels constructed of iron or steel would be unfeasible.

We have found that a cleansed vessel of iron or steel may satisfactorily be employed repeatedly for the polymerization or copolymerization of the aforementioned alkenyl aromatic compounds, without need for intermediate cleaning operations, provided that the material to be polymerized is rendered substantially free of absorbed oxygen prior to each polymerization reaction, and that each batch of polymerized material be removed from the vessel while at a temperature above the second order transition temperature of the polymeric product, and provided further that the vessel itself be maintained at a temperature above the second order transition temperature of the polymeric product in the interval between successive periods of service. It may be mentioned that, when a thermoplastic resin is warmed at a substantially constant rate, its rate of expansion per degree centigrade rise in temperature remains nearly constant up to a certain point and then increases sharply over a narrow range of temperatures after which it again becomes nearly constant with further rise in the temperature. The average value of the narrow range of temperatures within which the thermal expansion coefficient, i. e. the per cent expansion per degree centigrade, of the resin increases sharply is known as the "second order transition temperature" of the resin. A method of measuring second order transition temperatures is described by Boyer and Spencer in J. Appl. Phys. 15, 398 (1944). In most instances, the second order transition temperature is the same as, or within a few degrees centigrade of, the heat distortion temperature of a resin. When an iron or steel vessel is maintained at the elevated temperature required according to this invention, inner surfaces of the vessel remain coated with a continuous protective film, or layer, of the polymer which has been formed within the vessel, and corrosion of the metal surfaces, e. g. by the action of air or moisture, does not occur.

It may be mentioned that the iron or steel vessels to be employed in practice of the invention, and also the surfaces of any cooling or heating tubes inside such vessel, are preferably highly polished, since polished metal surfaces are more readily cleaned than unpolished surfaces. However, we have initially cleaned, by sandblasting, steel vessels having fairly rough unpolished inner surfaces and have satisfactorily employed them in practice of the invention. Vessels having polished iron or steel surfaces are usually cleaned by washing with a non-corrosive volatile organic solvent such as benzene, ligroin, or acetone, etc., so as to remove all grease or dirt from the surfaces and are protected against corrosion by an inert atmosphere, e. g. of nitrogen, natural gas, or carbon dioxide, etc., until the vessel is charged with the material to be polymerized. The vessel is usually charged with a polymerization mixture within a short time, e. g. a day or so, after being cleaned since, presumably because of moisture or other impurities usually present, the aforementioned inert gases of the quality readily obtainable on a commercial scale can seldom be relied upon to afford more than temporary protection of the cleaned surfaces against corrosion.

Except for the requirements that material to be polymerized be freed as nearly as possible of air prior to polymerization, and that a vessel of iron or steel be cleaned prior to use in polymerizing such material, and be maintained at temperatures above the second order transition temperature of the polymeric product between successive periods of service, polymerizations en masse of materials rich in alkenyl aromatic compounds are accomplished according to this invention in the same manner as in the prior art. For instance, the polymerization may be carried out in the presence or absence of a dissolved catalyst such as benzoyl peroxide, acetyl peroxide, lauryl peroxide, etc. In most instances, the polymerizations are accomplished at temperatures in the order of from 80° to 200° C., but lower or higher temperatures may be employed. Among the variety of materials which may advantageously be polymerized in accordance with the invention are styrene, mixtures of styrene and alpha-methyl styrene, ortho-methyl styrene, meta-methyl styrene, para-methyl styrene, ortho-chloro-styrene, meta-chloro-styrene, para-chloro-styrene, ortho-isopropyl styrene, meta-isopropyl styrene, para-isopropyl styrene, ortho-ethyl styrene, meta-ethyl styrene, para-ethyl styrene, mixtures of styrene and a minor amount of maleic anhydride, mixtures of styrene and a minor amount of methylmethacrylate, styrene and a minor amount of vinyl cyanide, etc.

In practice of the invention, monomeric styrene has been heated under vacuum, e. g. at from 200 to 500 millimeters absolute pressure, to temperatures in the order of from 90° to 100° C. so as to drive off any dissolved air or oxygen therefrom. Approximately 10 tons of the de-aerated styrene was charged into a steel vessel having polished inner surfaces which had previously been cleaned as thoroughly as possible to remove grease or rust therefrom. The styrene was heated within the closed vessel under an atmosphere of an inert gas for about 5 days, during which time the temperature was raised in stages from about 80° to about 150° C. At all times, the temperature was controlled by passage of heating or cooling fluids through steel tubes inside of the vessel. The resultant polymer was then melted by heating the same at temperatures between 200° and 250° C., and was discharged through a valved opening at the bottom of the vessel. During and subsequent to discharge of the polymeric material, the vessel itself was maintained at temperatures of from 100° to 200° C., i . e. at temperatures above the second order transition temperature of polystyrene which is approximately 82° C. The vessel was again charged with styrene which had been freed of air, and the operations just described were repeated. A series of successive polymerizations in the manner just set forth were carried out over a period of 5 months, at the end of which time the polished-steel inner surfaces of the reaction vessel were examined. The metal surfaces were still of bright appearance and free of rust or other corrosion. The polystyrene produced throughout the 5-month period was colorless, free of metal-containing impurities, and was of excellent quality.

The invention may be applied with advantage in carrying polymerizations out either batchwise or in continuous manner, provided that in a continuous process, wherein the material to be polymerized is passed through an iron or steel vessel within which it is heated to a polymerizing temperature, the vessel be maintained at temperatures above the second order transition temperature of the polymer during periods of shut-down, e. g. for inspection or repair of apparatus.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. A mass polymerization method which comprises charging a vessel, having substantially clean inner surfaces consisting for the most part of iron, with a polymerizable material, substantially free of dissolved oxygen and rich in an alkenyl aromatic compound having the general formula:

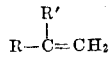

wherein R represents an aromatic radical of the benzene series and R' represents a member of the group consisting of hydrogen and the methyl radical, heating the polymerization mixture in the closed vessel until the mixture is polymerized to a stage at which it is solid at room temperature, heating the resultant polymer to a temperature at which it is sufficiently mobile to be discharged in liquid form, discharging the liquefied polymer from the vessel, recharging the vessel with another batch of the aforementioned polymerizable material which has been rendered substantially free of dissolved oxygen, and, during the period between discharge of the polymer first formed and recharging of the vessel with material to be polymerized, maintaining the inner surfaces of the vessel at temperatures between the second order transition temperature of the polymeric product and 250° C., and continuing the heating at temperatures within the range just stated until the mixture is polymerized to a stage at which it is solid at room temperature.

2. A method, as described in claim 1, wherein the polymerizable material consists for the most part of a monovinyl aromatic compound of the benzene series.

3. A method, as described in claim 1, wherein the polymerizable material is styrene.

4. A mass polymerization method which comprises passing a polymerizable material, substantially free of dissolved oxygen and rich in an alkenyl aromatic compound having the general formula:

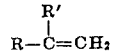

wherein R represents an aromatic radical of the benzene series and R' represents a member of the group consisting of hydrogen and the methyl radical, in continuous flow through a vessel, having substantially clean inner surfaces composed for the most part of iron, at a rate of flow and at elevated temperatures such that material flowing from the vessel is polymerized to a stage at which it is solid at room temperature, interrupting flow of material to the vessel and discharging polymer from the vessel, thereafter resuming flow of the material to the vessel where it is polymerized as just set forth, and throughout the foregoing operations and particularly during the period after interruption of the flow of polymerizable material to the vessel and from the start of said discharge of polymer from the vessel until the resumption of flow of polymerizable material to the vessel, maintaining the inner surfaces of the vessel at temperatures between the second order transition temperature of the polymeric product and 250° C.

5. A method, as described in claim 4, wherein the polymerizable material consists for the most part of a monovinyl aromatic compound of the benzene series.

6. A method, as described in claim 4, wherein the polymerizable material is styrene.

JAMES L. AMOS.
KENNETH E. STOBER.

REFERENCES CITED

The following references are of record in the file of this patent:

UNITED STATES PATENTS

| Number | Name | Date |
|---|---|---|
| 2,055,468 | Douglas | Sept. 29, 1936 |